United States Patent [19]

Fujii et al.

[11] Patent Number: 4,832,145
[45] Date of Patent: May 23, 1989

[54] FOUR WHEEL-DRIVE ANTI-LOCKING BRAKING

[75] Inventors: Etsuo Fujii; Makoto Sato; Seiichi Hirai, all of Saitama, Japan

[73] Assignee: Honda Giken Kogyo Kabushiki Kaisha, Tokyo, Japan

[21] Appl. No.: 205,975

[22] Filed: Jun. 13, 1988

Related U.S. Application Data

[62] Division of Ser. No. 876,144, Jun. 19, 1986.

[30] Foreign Application Priority Data

Jun. 21, 1985 [JP] Japan ................................. 60-135501
Jun. 25, 1985 [JP] Japan ................................. 60-138308
Nov. 15, 1985 [JP] Japan ................................. 60-256326

[51] Int. Cl.$^4$ ............................................. B60K 23/08
[52] U.S. Cl. ................................... 180/233; 180/247; 303/100
[58] Field of Search ............... 180/244, 247, 248, 249, 180/197, 233; 188/181 A; 303/100, 102, 106, 110, DIG. 2

[56] References Cited

U.S. PATENT DOCUMENTS

| 3,637,057 | 1/1972 | Okamoto | 192/13 R |
| 4,202,584 | 5/1980 | Sato | 303/110 |
| 4,538,700 | 9/1985 | Suzuki | 180/248 |
| 4,770,266 | 9/1988 | Yamaguchi | 180/233 |

FOREIGN PATENT DOCUMENTS 177721 10/1983 Japan ................................. 180/233

Primary Examiner—Charles A. Marmor
Assistant Examiner—Everett G. Diederiks, Jr.
Attorney, Agent, or Firm—Sughrue, Mion, Zinn, Macpeak & Seas

[57] ABSTRACT

A four-wheel-drive vehicle in which the brakes are individually controlled to prevent locking. According to the invention, during anti-locking brake, the torque transmitted between the front and rear wheels is reduced, either by disconnecting the inter-axle transmission or switching to a loosely coupled viscous coupling.

5 Claims, 8 Drawing Sheets

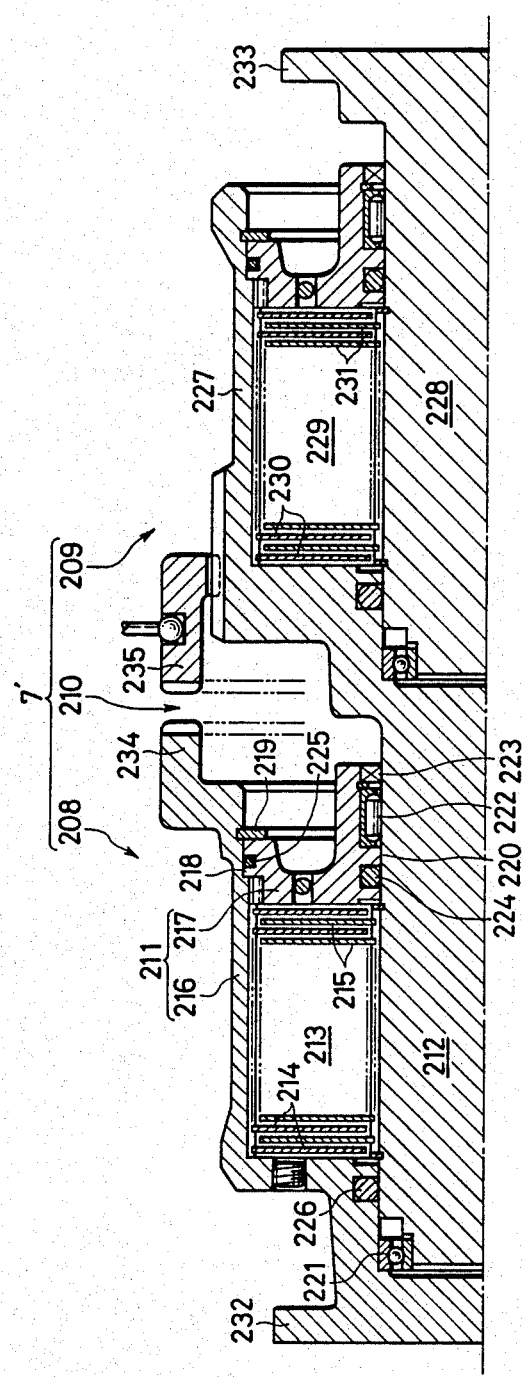

FOUR WHEEL-DRIVE ANTI-LOCKING BRAKING

This application is a division of Ser. No. 876,144, filed June 19, 1986.

BACKGROUND OF THE INVENTION

1. Field of the Invention

This invention relates to a vehicle having a brake oil pressure controller. More particularly, it relates to a four-wheel-drive vehicle with an anti-locking brake system. Separate axles link each of the wheels to front and rear differentials. The differentials receive power from an engine. This invention further relates to a four-wheel-drive vehicle of the type wherein brake mechanisms for the front and the rear wheels have oil pressure modulators constructed so as to reduce braking oil pressure when the vehicle is in anti-locking operation, dependent upon the change in the oil pressure in the controlling chambers.

The present invention also relates to a four-wheel-drive vehicle with an anti-locking brake system, wherein a brake oil pressure unit which controls the oil pressure for different brakes at the front and rear wheels of the vehicle is provided with an anti-locking controller which reduces the oil pressure of the brakes when the wheels are about to be locked. The engines directly couple to either the front or rear axles. The other set of axles are coupled to the engine through a viscous coupling, which has a plurality of clutch disks spline-coupled to an input and an output, respectively. The clutch disks are placed together in a sealed oil chamber defined between the input and the output and rotate relative to each other. A clutch is disengaged when the anti-locking controller is in anti-locking operation.

2. Background Art

Four-wheel-drive vehicle have been developed in order to improve the mobility of the vehicle and its running performance on snowy roads or the like where there is a low coefficient of friction between the wheels and the road way. Attempts have been made to provide four-wheel-drive vehicle with an anti-locking brake system.

If an anti-locking brake system used for a conventional two-wheel-drive vehicle is applied to a four-wheel-drive vehicle as it is, the wheels of the four-wheel-drive vehicle interfere with each other so that sufficient anti-locking effect cannot be produced. When the front wheels of the four-wheel-drive vehicle are controlled by high selection and its rear wheels are controlled by low selection, it is likely that one front wheel is locked and the other front wheel rotates at a speed almost corresponding to the speed of the vehicle. It is also very likely that both the rear wheels rotate at a speed corresponding to about half of the speed of the vehicle and the rear wheels slip if they are directly coupled to the front wheels. In anti-locking control, the rotational speed of the front wheels is controlled to be relatively lower than that of the rear wheels in order to shorten the braking distance of the vehicle and enhance the stability of movement of the vehicle. However, if the front wheels are directly coupled to the rear wheels, the anti-locking control cannot be effected because the rotational speed of the front wheels is equal to that of the rear wheels.

SUMMARY OF THE INVENTION

The present invention was made in consideration of the problems described above. Accordingly, it is an object of the present invention to provide a four-wheel-drive vehicle having an anti-locking brake system, wherein front and rear differentials are disconnected from each other in the anti-locking operation of the vehicle so as to produce sufficient anti-locking effect. Another object of the present invention to provide a four-wheel-drive vehicle having an anti-locking brake system, wherein two-wheel drive is performed during the anti-locking operation of the vehicle so as to produce sufficient anti-locking but neither a special detector for detecting the anti-locking operation nor a special motive power source for changing the vehicle to the two-wheel drive are needed.

According to the present invention, braking torque applied to front wheels in the braking of the vehicle is transmitted to the rear wheels through a motive power transmission system. The braking oil pressure controller reduces braking power when the controller has detected that the wheels are being locked. The motive power transmission system includes a unit which reduces the braking torque transmitted from the front wheels to the rear wheels when the braking oil pressure controller is in operation.

Further, according to the present invention, the front and the rear differentials are disconnected from each other in accordance with the action of the anti-locking mechanism between both the differentials.

Furthermore, according to the present invention, a motive power transmission/cutoff unit, located between the differentials, disconnects the front and the rear differentials from each other depending on the change in the oil pressure of an oil pressure chamber and the controlling oil pressure chambers of brake oil pressure modulators are connected to the oil pressure chamber of the cutoff unit.

In the anti-locking operation, the controlling oil pressure of the controlling pressure chamber changes to reduce the braking oil pressure, and the oil pressure of the pressure chamber of the motive power transmission/cutoff unit also changes to disconnect the front and the rear differentials from each other to put the four-wheel-drive vehicle into the two-wheel drive state.

BRIEF DESCRIPTION OF THE DRAWINGS

In the drawings.

FIG. 4 shows a schematic view of the driving system of a four-wheel-drive vehicle. FIG. 5 shows a hydraulic circuit diagram of a brake system. FIG. 6 shows a longitudinal sectional view of a brake oil pressure modulator for a rear wheel. FIG. 7 shows a longitudinal sectional view of a motive power transmission/cutoff unit.

FIG. 10 shows a longitudinal sectional view of a connection unit.

DETAILED DESCRIPTION OF HE PREFERRED EMBODIMENTS

Embodiments of the present invention are now described with reference to the drawings.

Figure 1:
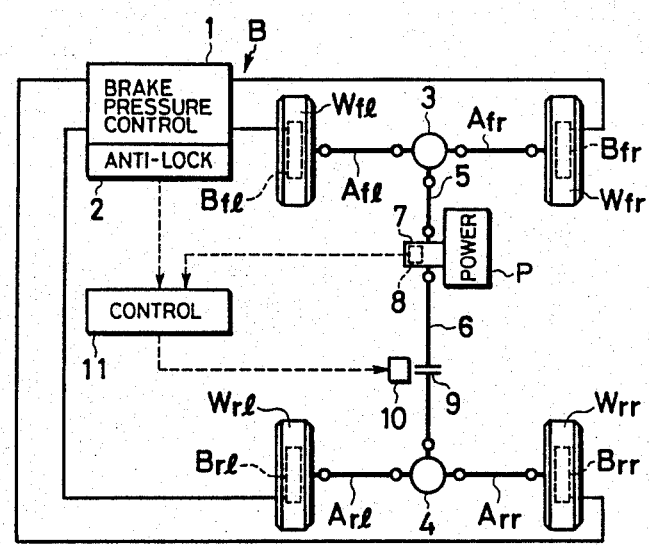
FIGS. 1, 2 and 3 show schematic views of a first, a second and a third embodiments of the present invention, respectively.

FIG. 1 shows the first embodiment of the present invention. A pair of front wheels Wfl and Wfr and a pair of rear wheels Wrl and Wrr are suspended from the front and rear portions of a vehicle body, not shown in the drawing. Brake mechanisms Bfl, Bfr, Brl and Brr are provided for the wheels Wfl, Wfr, Wrl and Wrr. An oil pressure control mechanism 1, which constitutes a brake system B together with the brake mechanisms Bfl, Bfr, Brl and Brr, includes an anti-locking mechanism 2, which reduces the braking oil pressure of the brake mechanism so as to prevent the wheels Wfl, Wfr, Wrl and Wrr from being locked.

A pair of front axles Afl and Afr coupled to the left and the right front wheels Wfl and Wfr are coupled to each other by a front differential 3. Similarly, a pair of rear axles Arl and Arr coupled to the left and the right rear wheels Wrl and Wrr are coupled to each other by a rear differential 4. A front drive shaft 5 and a rear drive shaft 6 are coupled to input shafts of the front and the rear differentials 3 and 4. The drive shafts 5 and 6 are coupled to each other by a central differential 7. A power unit P comprising an engine and a transmission is coupled to the input shaft of the central differential 7.

The central differential 7 is provided with a locking mechanism 8. When the locking mechanism 8 is in operation, the front and the rear drive shafts 5 and 6 are directly coupled to each other so that the four wheels are all driven.

A clutch 9, which is normally in an engaged state, is provided as a disconnection means midway in the rear drive shaft 6. The clutch 9 is disengaged by an actuator 10 which is put into action by a signal from a controller 11. When a signal indicating that the locking mechanism 8 of the central differential 7 is in a locked state and a signal indicating that the anti-locking mechanism 2 is in an anti-locking state are input into the controller 11. The controller supplies the actuator 10 with the above-mentioned signal for putting the actuator into action to disengage the clutch 9. That is, a combination of anti-locking and locking in the brake pressure controller 1 and the central differential 7 causes the clutch 9 to be disengaged. To detect the anti-locking action of the anti-locking mechanism 2, the movement of the piston of a brake oil pressure modulator not shown in the drawings, is detected, or a slip detection signal is input into a control section for regulating the application or controlling oil pressure to the brake oil pressure modulator.

The operation of this embodiment is hereafter described. When one of the wheels Wfl, Wfr, Wrl and Wrr is about to be locked while the locking mechanism 8 remains in a locked state (i.e., the front and the rear drive shafts 5 and 6 are directly coupled to each other so as to drive the wheels), the anti-locking mechanism 2 is put into action. Responding to the activation of the anti-locking mechanism 2, the controller 11 sends out the signal to the actuator 10 to disengage the clutch 9. The front axles Afl and Afr and the rear axles Arl and Arr are thus prevented from interfering with each other, so that an enough anti-locking braking can be produced.

Figure 2:
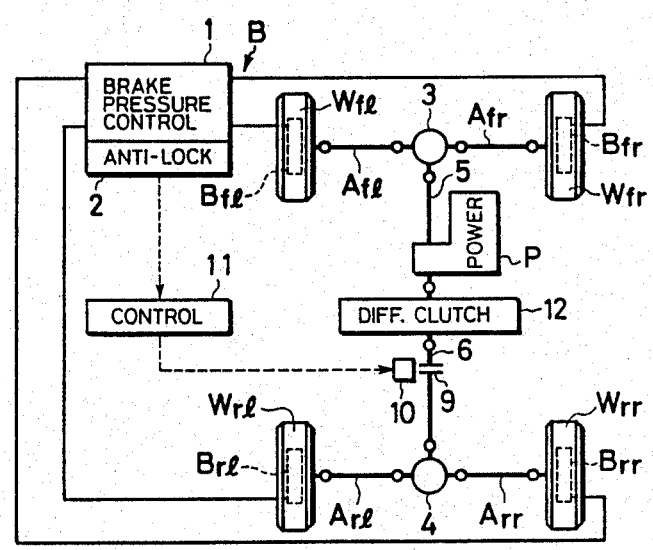

FIG. 2 shows the second embodiment of the present invention. The portions of this embodiment are given the same reference symbols as the corresponding portions of the first embodiment. A differential limitation clutch 12 such as a viscous clutch, which is engaged when the relative rotational speed of the front drive shaft 5 differs significantly from that of the rear drive shaft 6 and provided between the front drive shaft 5 coupled to a power unit P and the rear drive shaft 6. The rear drive shaft 6 also has a clutch 9 in the midway portion of the shaft 6.

When the front wheels Wfl and Wfr have come to significantly slip on the surface of the road when only the front wheels are being driven, the differential limitation clutch 12 is automatically engaged because of the large rotational speed difference between the front and the rear drive shafts 5 and 6 so that all the four wheels of the vehicle are driven.

In the second embodiment, when the differential limitation clutch 12 is engaged s that all the four wheels are driven, the actuator 10 is operated to disengage the clutch 9 to produce sufficient anti-locking effect as well as in the first embodiment.

The present invention can also be applied to the four-wheel drive of an optional-four-wheel-drive vehicle provided with a selectively switched clutch instead of the differential limitation clutch 12 so as to change the vehicle between two-wheel drive and four-wheel drive.

Figure 3:
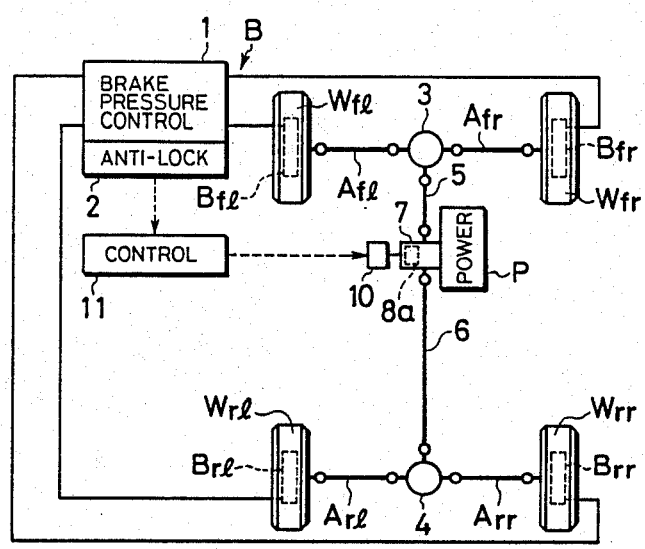
Figure 4:
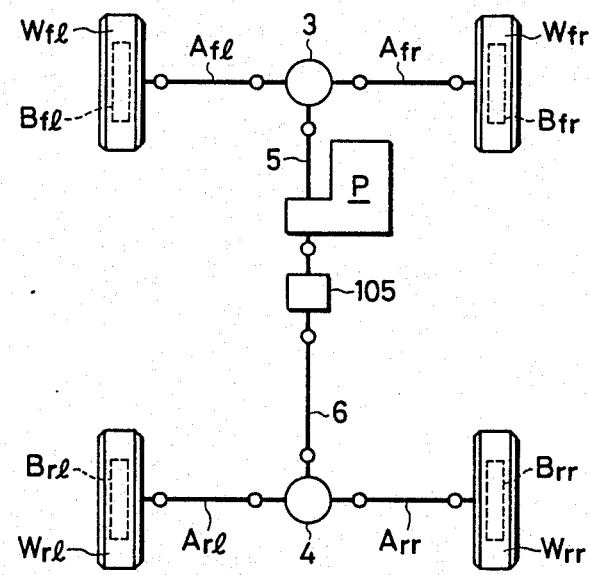
FIGS. 4, 5, 6 and 7 show a fourth embodiment of the present invention.

FIG. 3 shows the third embodiment of the present invention. The portions of this embodiment are given the same reference symbols as the corresponding portion of the first or the second embodiment. The locking mechanism 8a of the central differential 7 acts as a disconnection means. The locking mechanism 8a is forcibly removed from a locked state by an actuator 10 in accordance with a signal sent out from the controller 11 in anti-locking operation. When the anti-locking braking operation is performed when the locking mechanism 8a remains in the locked state to drive all the four wheels of a vehicle, the locking mechanism 8a is removed from the locked state to prevent the front axles Afl and Afr and rear axles Arb and Arr from interfering with each other. As a result, enough anti-locking effect can be produced in the third embodiment as well as in the other embodiments described above.

According to the present invention, a means for disconnecting the front and rear differentials from each other in accordance with the action of an anti-locking braking mechanism is provided between the front and the rear differentials to disconnect the differentials from each other in anti-locking braking operation so as to prevent interference. As a result, sufficient anti-locking braking can be produced.

A fourth embodiment of the invention will be described with reference to FIGS. 4–7.

The front drive shaft 5 and the rear drive shaft 6 are coupled to the input shafts of the front and rear differentials 3 and 4. The power unit P comprising the engine and the transmission is coupled to one drive shaft, the front drive shaft 5, for example. Both the drive shafts 5 and 6 are coupled to each other by a motive power transmission/cutoff unit 105 capable of either coupling or uncoupling the drive shafts to or from each other.

Figure 5:
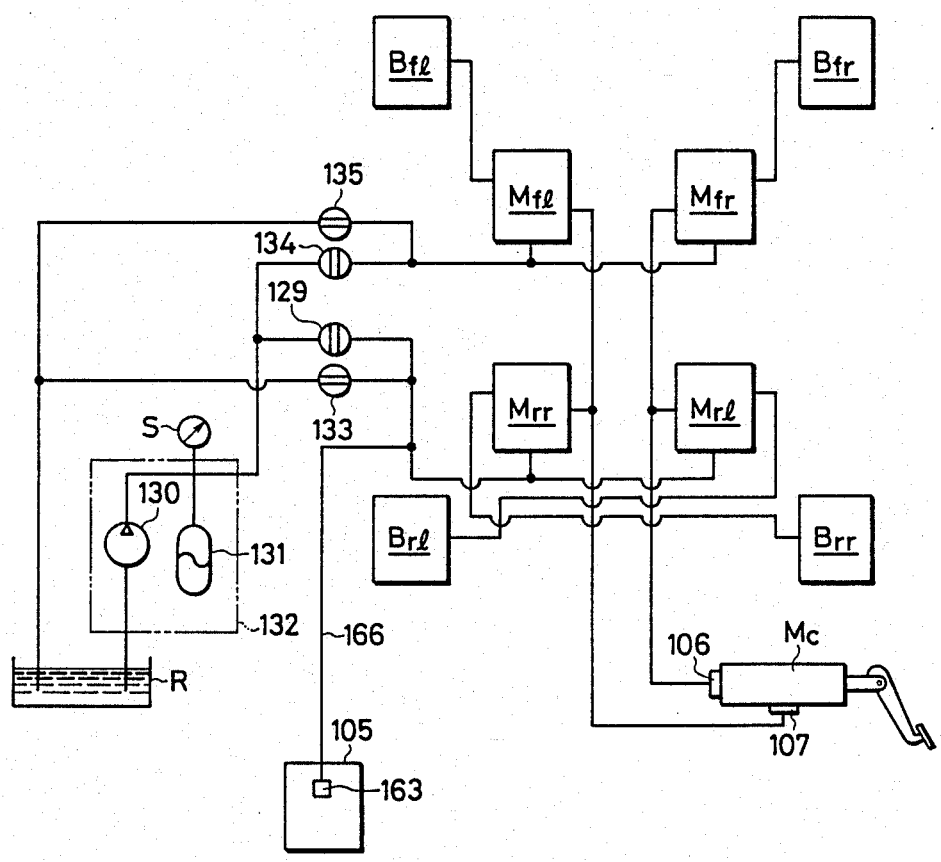

As shown in FIG. 5, brake oil pressure modulators Mfl and Mfr for the front wheels are connected to the brake mechanisms Bfl and Bfr for the left and right front wheels, respectively. Similarly, brake oil pressure modulators Mrl and Mrr for the rear wheels are connected to the brake mechanisms Brl and Brr for the left and the right rear wheels, respectively. The brake oil pressure modulators Mfl, Mfr, Mrl and Mrr have basically the same construction as each other, and supply the brake mechanism Bfl, Bfr, Brl and Brr with braking oil pressure corresponding to the output oil pressure from both the output ports 106 and 107 of a tandem master cylinder Mc. The brake oil pressure modulators Mfr and Mrl for the right front wheel Wfr and the left rear wheel Wrl are connected to the output port 106, while the brake oil pressure modulators Mf and Mrr for the left front wheel Wfl and the right rear wheel Wrr are connected to the other output port 107 This configuration of modulators and brake mechanisms and their control is exemplary for all the embodiments.

Figure 6:
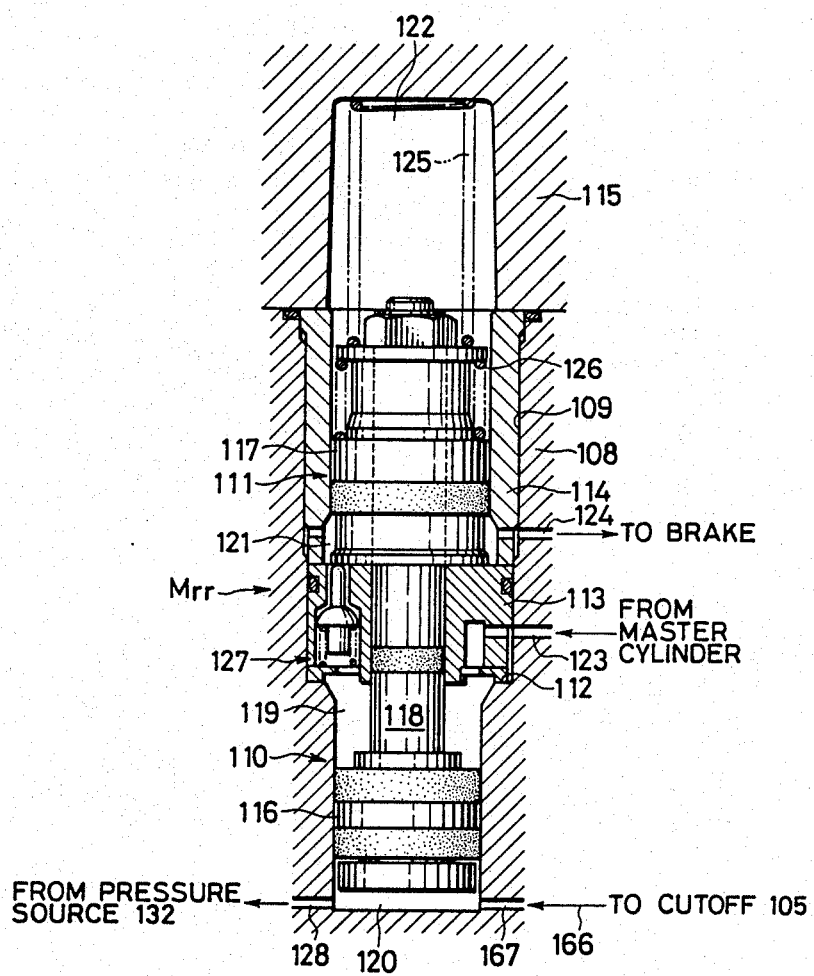

The basic construction of the brake oil pressure modulator Mrr for the right rear wheel Wrr is hereafter described with reference to FIG. 6 A partition 113, which is supported on a step 112 provided at the halfway portion of a bottomed cylindrical hole 109 provided in the casing 108 of the modulator Mrr, is fitted in the cylindrical hole 109 so that the hole is divided into a first, lower cylindrical portion 110 and a second, upper cylindrical portion 111. A lid 115, which is placed in contact with a cylindrical sleeve 114 to push and fix the partition 113 on the step 112, is joined to the casing 108. A first, lower piston 116 is slidably fitted in the first cylindrical portion 110. A second, upper piston 117 is slidably fitted in the second cylindrical portion 111. The first piston 116 is integrally coupled with a piston rod 118 movably and oil-tightly extending through the partition 113. The second piston 117 is loosely fitted on the piston rod 118 so that the second piston 117 can be moved in its axial direction relative to the piston rod 118.

An input oil pressure chamber 119 is defined in the first cylindrical portion 110 by the first piston 116 and the partition 113. A controlling oil pressure chamber 120 is defined in the first cylindrical portion 110 by the first piston 116 and is located opposite the partition 113. An output oil pressure chamber 121 is defined in the second cylindrical portion 111 by the second piston 117 and the partition 113. A spring chamber 122 is defined in the second cylindrical portion 111 by the second piston 117 and is located opposite the output oil pressure chamber 121. An inlet oil passage 123, which is connected to the output port 107 of the master cylinder Mc, is always connected to the input oil pressure chamber 119. An outlet oil passage 124, which is connected to the brake mechanism Brr for the right rear wheel Wrr, is always connected to the output oil pressure chamber 121.

A first spring 125 biases the piston rod 118 toward the first cylindrical portion 111 and is located in the spring chamber 122. A second spring 126 biases the second piston 117 toward the partition 113 and is located between the piston rod 118 and the second piston 117.

The partition 113 is provided with a valve mechanism 127, which is opened depending on the movement of the second piston 117 toward the partition 113. When the second piston 117 is moved toward the partition 113 in accordance with the increase in the oil pressure of the input oil pressure chamber 119, the valve mechanism 127 is opened to connect the input oil pressure chamber 119 to the output oil pressure chamber 121 so that braking oil pressure from the master cylinder Mc is applied to the brake mechanism Brr for the right rear wheel Wrr. When the oil pressure of the controlling oil pressure chamber 120 rises so that the second piston 117 is separated from the partition 113, the valve mechanism 127 is closed to disconnect the input oil pressure chamber 119 from the output oil pressure chamber 121. At that time, the volume of the output oil pressure chamber 121 is increased so that the braking oil pressure drops.

An oil passage 128 communicates with the controlling oil pressure chamber 120. As shown in FIG. 5, the oil passage 128 is connected to a controlling oil pressure source 132 through a normally closed solenoid valve 129 and to a reservoir R through a normally open solenoid valve 133. The controlling oil pressure source 132 comprises a hydraulic pump 130 and an accumulator 131 and is provided with an oil pressure sensor S.

When either of the right and the left rear wheels Wrr and Wrl is about to be locked while being braked, the solenoid valve 129 is opened and the other solenoid valve 133 is closed, so that the controlling oil pressure from the controlling oil pressure source 132 is applied to the controlling oil pressure chamber 120. Since the volume of the output oil pressure chamber 121 increases correspondingly as the oil pressure of the controlling oil pressure chamber 120 rises, the braking oil pressure is reduced to prevent the rear wheels Wrr and Wrl from being locked. The operation of the solenoids 129, 133, 134 and 135 are part of the operation of the anti-locking mechanism 2.

The brake oil pressure modulators Mfl and Mfr for the front wheels Wfl and Wfr have basically the same construction as the above-described brake oil pressure modulator Mrr for the rear wheel Wrr. The controlling oil pressure chamber (not shown in the drawings) of each of the modulators Mfl and Mfr for the front wheels is connected to the controlling oil pressure source 132 through a normally closed solenoid valve 134 and to the reservoir R through a normally open solenoid valve 135.

Figure 7:
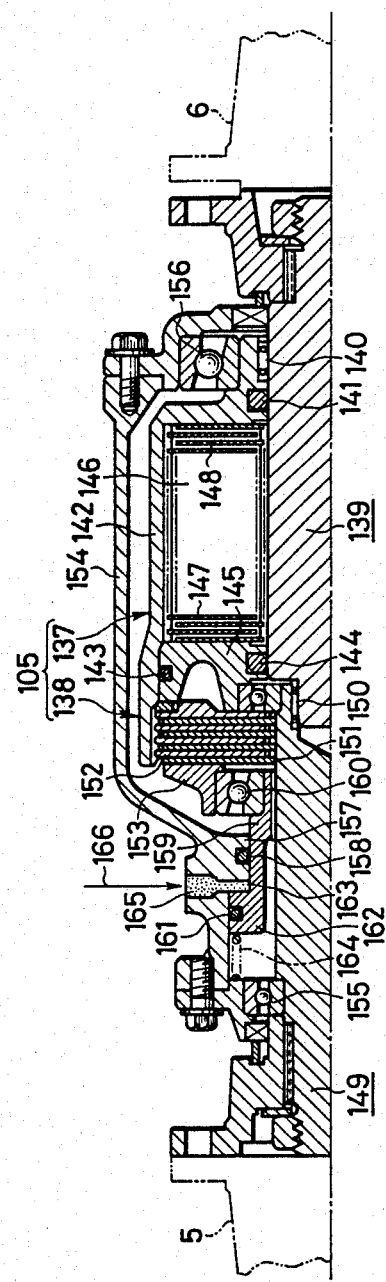

As shown in FIG. 7, the motive power transmission/cutoff unit 105 comprising a differential limitation clutch 137 comprising a plurality of outer disks 147 spline coupled to an outer clutch member 142, and a plurality of inner clutch disks 148 spline-coupled to an output shaft 139 coaxially coupled to the rear drive shaft 6. The outer and the inner disks 147 and 148 are alternately juxtaposed together in a. sealed oil chamber 146 defined by the output shaft 139, the outer clutch member 142 (shaped as a bottomed cylinder and rotatably supported with a bearing 140 and a seal 141 on the output shaft 139), and an end plate 145 secured with seals 143 and 144 between the inside circumferential surface of the outer clutch member 142 and the outside circumferential surface of the output shaft 139. High-viscosity oil and a small quantity of air, which allows the oil to thermally expand, are sealed in the sealed oil chamber 146.

When a relative rotation has occurred between the outer clutch member 142 and the output 139, the clutch disks 147 and 148 rotate relative to each other while shearing the high-viscosity oil. When the speed of the relative rotation has become higher, the temperature of the oil rises so that a complicated temperature gradient occurs in each of the clutch disks 147 and 48. The portions of the clutch disks 147 and 148 are frictionally engaged with each other or the clearance between the portions is made extremely small, because of the interaction of the rise in the pressure of the sealed oil chamber 146 and the strain caused by the complicated temperature gradient. As a result, the outer clutch member 142 and the output shaft 139 are coupled to each other.

A bearing 150 is provided between the end of the output shaft 139 and that of an input shaft 149 coaxially coupled to the front drive shaft 3.

The multiple-disk clutch 138 comprises a plurality of disks 151 spline-coupled to an input shaft 149 serving as an inner clutch member, and a plurality of disks 152 spline-coupled to the outer clutch member 142. The disks 151 and 152 are juxtaposed together between the end plate 145 and a push plate 153. When the push plate 153 is thrust toward the end plate 145, the input shaft 149 and the outer clutch member 142 are directly coupled to each other. When the push plate 153 is moved away from the end plate 145, the input shaft 149 is uncoupled from the outer clutch member 142 so that the input shaft 149 is disconnected from the output shaft 139.

A case 154 covering the differential limitation clutch 137 and the multiple-disk clutch 138 is fitted with bearings 155 and 156 between the input shaft 149 and the outer clutch member 142. A projection 147 extends radially inwards from the inside surface of the case 154 and also extends along its total circumference near the input shaft 149. A cylindrical push member 159 is slidably fitted on a seal 158 on the inside surface of the projection 157 so that the push member 159 can be moved along the input shaft 149. One end of the push member 159 is coupled to the push plate 153 through a bearing 160 so that the push plate 153 is moved in the axial direction of the input shaft 149 is conjunction with the movement of the push member 159.

A piston 162 is slidably fitted with a seal 161 on the inside surface of the case 154 at a position between the projection 157 and the front drive shaft 5. The piston 162 is integrally coupled to the push member 159. An oil pressure chamber 163, which is located on the side of the piston 162 which faces the multiple-disk clutch 138, is defined by the piston 162, the push member 159 and the case 154. A spring 164 is provided between the piston 162 and the case 154 opposite the oil pressure chamber 163. The force of the spring 164 urges the piston 162 or the push plate 153 in such a direction as to bring the clutch disks 151 and 152 into pressure contact with each other.

The case 154 has an oil passage 165 communicating with the oil pressure chamber 163. An oil passage 166 is connected to the oil passage 165. The oil passage 166 is also connected to an oil passage 167 provided in the casing 108 (FIG. 6) and communicating with the controlling oil pressure chamber 120 of the brake oil pressure modulator Mrr for the rear wheel Wrr. For that reason, in the anti-locking operation of the rear wheels Wrl and Wrr, the oil pressure of the oil pressure chamber 163 rises correspondingly as that of the controlling oil pressure 120 rises, so that the piston 162 is moved leftward (as to FIG. 7) against the force of the spring 164. As a result, the push plate 153 is moved away from the end plate 145.

The operation of this embodiment is hereafter described. When the power unit P provides power, both the front wheels Wfl and Wfr are driven through the front drive shaft 5, the front differential 3 and the front axles Afl and Afr. At that time, since the multiple-disk clutch 138 is already in a directly coupled state by the force of the spring 164, the differential limitation clutch 137 is in a directly coupled state determined by the relative rotation between the front and the rear drive shafts 5 and 6 so that the rear wheels Wrl and Wrr are driven through the rear propeller shaft 4, the rear differential 2 and the rear axles Arl and Arr. Four-wheel drive is thus achieved.

When the anti-locking operation of the rear wheels Wrl and Wrr is performed in the four-wheel drive, the oil pressure of the oil pressure chamber 163 of the transmission/cutoff unit 105 rises in accordance with the application of the controlling oil pressure to the controlling oil pressure chambers 120 of the pressure modulator (FIG. 6) so that the piston 162 is moved against the force of the spring 164. As a result, the multiple-disk clutch 138 is removed from the directly coupled state, the outer clutch member 142 of the differential limitation clutch 137 is allowed to freely rotate, and the input shaft 149 and the output shaft 139 are uncoupled from each other. That is, the front and the rear drive shafts 5 and 6 are uncoupled from each other. The front wheels Wfl and Wfr are thus prevented from interfering with the rear wheels Wrl and Wrr, so that sufficient anti-locking effect can be produced.

Figure 8:
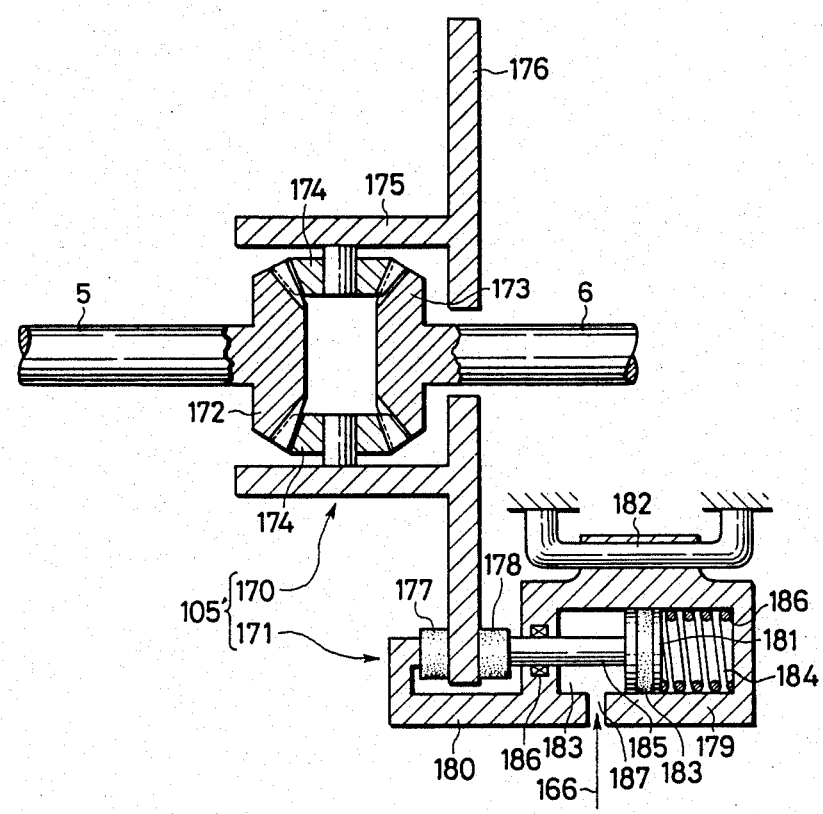
FIG. 8 shows a longitudinal sectional view of a motive power transmission/cutoff unit in another embodiment of the present invention.

FIG. 8 shows a motive power transmission/cutoff unit 105' in the second embodiment of the present invention. Unit 105' comprises a bevel-gear clutch 170 and a brake 171, which are provided between a front and a rear drive shafts 5 and 6.

The clutch 170 comprises a bevel side gear 172 secured to the front drive shaft 5, a bevel side gear 173 secured to the rear drive shaft 6 and facing the bevel side gear 172, a plurality of bevel pinions 174 engaged with the bevel side gears 172 and 173, and a case 175 rotatably supporting the bevel pinions 174. A disk 176 is integrally provided on the case 175.

In the brake 171, a pair of friction shoes 177 and 178 are provided at both the sides of the disk 176, which is pinched by the shoes 177 and 178 to inhibit the rotation of the disk 176. The brake 171 comprises a caliper body 180 fitted with the friction shoe 177. The caliper body 180 has a cylindrical portion 179 and is movable in the axial direction of the disk 176. A piston 181 is coupled to the friction shoe 178 and is slidably fitted in the cylindrical portion 179. The caliper body 180 is supported by a secured support pin 182 so that the caliper body can be moved in the axial direction of the cylindrical portion 179. The piston 181 is slidably fitted with a seal 183 in the cylindrical portion 179 so that the piston divides the interior of the cylindrical portion 179 into an oil pressure chamber 183 nearer the disk 176 and a spring chamber 184 farther from the disk 176. A piston rod 185 is integrally coupled to the piston 181 and movably extends through the end wall of the cylindrical portion 179 at the oil pressure chamber 183. A seal 186 is interposed between the piston rod 185 and the end wall. The friction shoe 178 is provided at the tip of the piston rod 185.

A spring 186 is provided in the spring chamber 184. An oil passage 166 communicating with the controlling oil pressure chamber 120 (refer to FIG. 6) of a brake oil pressure modulator Mrr for a right rear wheel, for example, is connected to an oil passage 187 provided in the cylindrical portion 179 and communicating with the oil pressure chamber 183.

In the motive power transmission/cutoff unit 105, in normal operation, the disk 176 is pinched between the friction shoes 177 and 178 by the force of the spring 186 to inhibit the rotation of the disk 176 and the case 175. As a result, the front and the rear drive shafts 5 and 6 are coupled to each other to perform four-wheel drive. In the anti-locking operation of rear wheels Wrl and Wrr, the friction shoes 177 and 178 are separated from the disk 176 as the oil pressure of the oil pressure chamber 183 rises. As a result, the disk 176 and the case 175 are allowed to freely rotate to uncouple the front and the rear drive shafts 5 and 6 from each other. The rear wheels Wrl and Wrr are thus prevented from interfering with the front wheels Wfl and Wfr, so that sufficient anti-locking effect can be produced, just as satisfactorily as in the fourth embodiment shown in FIG. 4–7.

According to the present invention, the oil pressure of a controlling oil pressure chamber is applied to the oil pressure chamber of a motive power transmission/cut-off unit to disconnect the front and the rear differentials from each other during anti-locking operation. As a result, the front and rear wheels are prevented from interfering with each other, so that sufficient anti-locking effect can be produced. A special detector for detecting the anti-locking operation and a special driving power source for operating the motive power transmission/cutoff unit are not needed.

Still another embodiment of this invention will now be described.

A four-wheel-drive vehicle has a connection unit generally comprising a single viscous coupling and a single dog clutch. When the dog clutch is engaged, the vehicle is put in the state of four-wheel drive. When the dog clutch is disengaged, the vehicle is put in the state of two-wheel drive.

When the driving side and driven side of the dog clutch are different from each other in rotational speed, it is difficult to engage the dog clutch. For that reason, once the dog clutch is disengaged during the movement of the vehicle, the dog clutch cannot be easily engaged again during the movement of the vehicle. Therefore, once the dog clutch is disengaged during the movement of the vehicle so as to put it into the state of two-wheel drive, it is difficult to put the vehicle back into the state of four-wheel drive in order to reaccelerate the vehicle.

To achieve further improvement, another embodiment was made in consideration of the circumstances described above to provide a four-wheel-drive vehicle having an anti-locking brake system, the four-wheel drive of which is enabled even if a clutch is disengaged. Thus, the reaccelerating capability of the vehicle is improved.

According to this embodiment, a connection unit is composed of a pair of viscous coupling connected in series with each other, and there is a clutch disposed between the input or output members of both the viscous couplings.

When the clutch is engaged, a power unit is connected to the front or rear axles through one of the viscous couplings. When the clutch is disengaged, the power unit is connected to the front or rear axles through both the viscous couplings. For that reason, even when the clutch is disengaged, the four wheels of the four-wheel-drive vehicle can be driven although the ratio of torque transmission to the front or rear axles is low.

Figure 9:
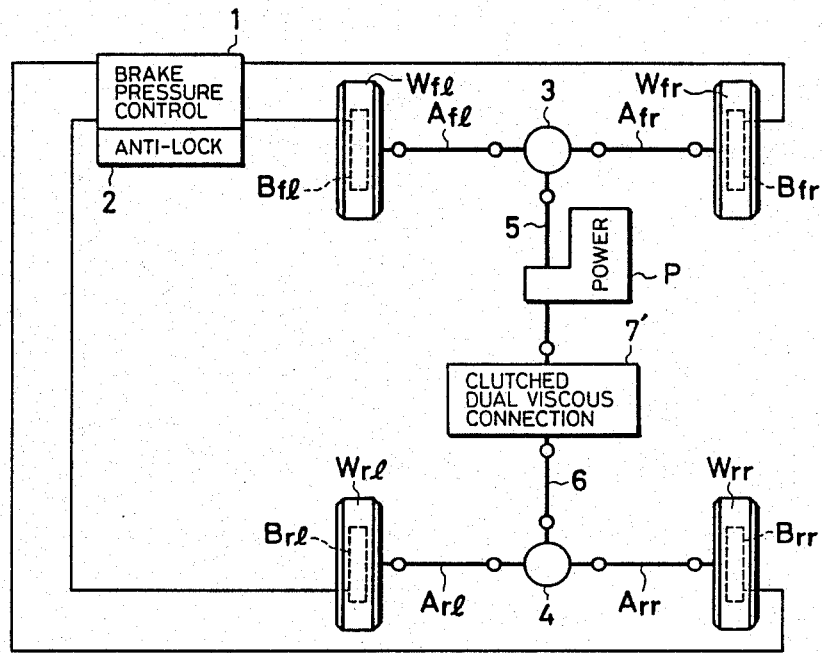
FIG. 9 shows a schematic view of the driving system of a vehicle.

As shown in FIG. 9, brake oil pressure unit 1, which controls the oil pressure of the brake mechanism Bfl, Bfr, Brl and Brr, is provided with the anti-locking controller 2, which functions to reduce the oil pressure of the brake mechanisms to prevent the wheels Wfl, Wfr, Wrl and Wrr from being locked. The front and the rear drive shafts 5 and 6 are coaxially coupled to each other by a connection unit 7'.

As shown in FIG. 10, the connection unit 7' comprises a first and a second viscous couplings 208 and 209, connected in series with each other, and a dog clutch 210.

The first viscous coupling 208 comprises a plurality of outer clutch disks 214 spline-coupled to a housing 211 serving as an input shaft, and a plurality of inner clutch disks 215 spline-coupled to an intermediate shaft 212 rotatable relative to the housing 211 and serving as an output shaft of the first coupling 208. The outer and the inner clutch disks 214 and 215 are alternately juxtaposed together in a sealed oil chamber 213 defined by the housing 211 and the intermediate shaft 212.

The housing 211 comprises a bottomed cylindrical body 216, and an end plate 217 coupled to the open end of the cylindrical body 216. A step 218 is provided on the inside surface of the bottomed cylindrical body 216 near its open end. The end plate 217 is fitted in the open end of the bottomed cylindrical body 216 and spline-coupled to it until the end plate 217 is brought into contact with the step 218. A stop ring 219 is fitted in the inside surface of the bottomed cylindrical body 216 so as to keep the end plate 217 from dropping off outwards. A through hole 220 is provided in the center of the end plate 217.

Bearings 221 and 222 are provided between respectively the closed end of the bottomed cylindrical body 216 and the inside surface of the end plate 217 along the through hole 220 so as to rotatably support the shaft 212 in the housing 211.

Seals 223 and 224 are provided between the inside surface of the end plate 217 and the outside surface of the shaft 212, at both the sides of the bearing 222. A seal 225 is provided between the outside surface of the end plate 217 and the inside surface of the bottomed cylindrical body 216. A seal 226 is provided between the shaft 212 and the closed end of the bottomed cylindrical body 216.

High-viscosity oil such as silicone oil and a small quantity of air for allowing the oil to thermally expand are sealed in the sealed oil chamber 213 defined between the housing 211 and the shaft 212. The clutch disks 214 and 215 alternately juxtaposed together in the sealed oil chamber 213 are provided with openings (not shown in the drawings) for allowing the oil to flow through.

When a relative rotation occurs between the housing 211 and the shaft 212, the clutch disks 214 and 215 of the first viscous coupling 208 rotate relative to each other while shearing the high-viscosity oil, so that torque is transmitted between the housing 211 and the shaft 212 by the viscosity of the oil. When the relative speed of the rotation becomes higher, the temperature of the oil rises so that a complicated temperature gradient arises in each of the clutch disks 214 and 215. The portions of the clutch disks 214 and 215 adjacent to each other are frictionally engaged with each other or the clearance between the portions is made extremely small, because of the interaction of the rise in the pressure of the sealed oil chamber 213 and the strain caused by the complicated temperature gradient. As a result, the viscous transmission of the torque between the housing 211 and the shaft 212 is replaced with the frictional transmission of the torque therebetween. For that reason, the higher the relative speed of the rotation between the housing 211 and the shaft 212 becomes, the larger the torque that can be transmitted.

The second viscous coupling 209 has basically the same construction as the first viscous coupling 208. The second viscous coupling 209' comprises a plurality of outer clutch disks 230 spline-coupled to a housing 227 serving as an input shaft, and a plurality of inner clutch disks 231 spline-coupled to a shaft 228 serving as an output shaft and rotatable relative to the housing 227. The outer and the inner clutch disks 230 and 231 are alternately juxtaposed together in a sealed oil chamber 229 defined by the housing 227 and the shaft 228.

The intermediate shaft 212 of the first viscous coupling 208 and the housing 227 of the second viscous coupling 209 are integrated with each other so that the first and the second couplings 208 and 209 are connected in series with each other.

A flange 232 is provided at the closed end of the bottomed cylindrical body 216 of the housing 211 of the first viscous coupling 208. The front drive shaft 5 is coupled to this flange 232.

Another flange 233 is provided at the end of the output shaft 228 projecting out of the housing 227 of the second viscous coupling 209. The rear drive shaft 6 is coupled to the flange 233.

The dog clutch 210 is provided on and between the housings 211 and 227 of the two viscous coupling 208 and 209. The dog clutch 210 comprises fixed teeth 234 secured to the housing 211 of the first viscous coupling 208, and axially movable teeth 235 spline-coupled to the housing 227 of the secured viscous coupling 209 so that the movable teeth 235 can be engaged with the fixed teeth 234. The movable teeth 235 are moved in the axial direction of the dog clutch 210 by a moving mechanism not shown in the drawings.

The transmission efficiency of the first viscous coupling 208 is set lower than that of the second viscous coupling 209.

The operation of this embodiment is hereafter described. In the normal running of the vehicle, the dog clutch 210 is in the engaged state so that the driving power of the front propeller shaft 5 is transmitted to the rear propeller shaft 6 through the second viscous coupling 209 having a relatively high ratio of torque transmission and the first viscous coupling 208 is bypassed. For that reason, driving power is transmitted to the rear wheels Wrl and Wrr as well as to the front wheels Wfl and Wfr so that all the four wheels of the vehicle are driven. When one of the wheels Wl, Wfr, Wrl and Wrr are about to be locked during four-wheel drive of the vehicle, the dog clutch 210 is disengaged in accordance with the operation of the anti-locking controller 2 so that the front and the rear drive shafts 5 and 6 are coupled to each other through the first and the second viscous couplings 208 and 209 connected in series with each other. The now engaged first viscous coupling 208 is less tightly coupled than the permanently engaged second viscous coupling 209. As a result, the interference of the front wheels Wfl and Wfr with the rear wheels Wrl and Wrr is minimized so that sufficient anti-locking effect can be produced.

The amount of torque transmitted through the first and the second viscous couplings 208 and 209 increases as the rotational speed of the front drive shaft 5 rises at the time of reacceleration of the vehicle while the dog clutch 210 remains disengaged. As a result, the rear wheels Wrl and Wrr can be driven as in the four-wheel drive of the vehicle.

Although the dog clutch 210 is provided between the input members of the first and the second viscous couplings 208 and 209, the dog clutch 210 may be provided between the output members of the couplings, and a different kind of clutch may be provided therebetween instead of the dog clutch 210.

According to the last embodiment, a disconnection unit is composed of a pair of viscous couplings connected in series with each other, and a clutch provided between the input or output members of the viscous couplings. For that reason, even if the clutch remains disengaged, a vehicle can be put back into four-wheel drive at the time of reacceleration of the vehicle. The reaccelerating capability of the vehicle is thus enhanced.

We claim:

1. A four-wheel drive vehicle, comprising:
   a set of front wheels;
   a set of rear wheels;
   brakes on all said wheels;
   anti-locking means for preventing locking of at least one of said rear wheels;
   a motive power transmission system linking said front wheels and said rear wheels, whereby braking torque applied to said front wheels is transmitted to said rear wheels;
   wherein said power transmission system includes means for reducing braking torque transmitted from said front wheels to said rear wheels when said anti-locking means are operating;
   wherein said anti-locking means comprises: a braking oil pressure controller for controlling braking oil pressure applied to said brakes;
   wherein said braking oil pressure controller comprises: brake oil pressure modulators for reducing braking oil pressure, each said modulator including a controlling oil pressure chamber, the reducing of said braking oil pressure depending on an oil pressure in said controlling oil pressure chamber; and
   wherein said reducing means includes a cutoff oil pressure chamber and means responsive to the oil pressure in said cutoff oil pressure chamber for disconnecting said front and rear sets of wheels, said cutoff oil pressure chamber being connected to at least one of said controlling oil pressure chambers, so that when the oil pressure in said controlling oil pressure chambers changes due to anti-locking operation, said front and rear sets of wheels are disconnected from one another.

2. A four-wheel-drive vehicle as recited in claim 1, wherein said motive power transmission system comprises:
   an axle for each of said wheels;
   a front differential providing motive power to each of the axles of said front wheels;
   a rear differential providing motive power to each of the axles of said rear wheels, said front and rear differentials being normally connected together in four-wheel drive;
   and wherein said reducing means comprises means for disconnecting said front and rear differentials.

3. A four-wheel-drive vehicle as recited in claim 2, wherein said disconnecting means comprises a clutch on a drive shift linking said front and rear differentials.

4. A four-wheel-drive vehicle as recited in claim 1, further comprising:
   a pair of front axles providing motive power to said front wheels;
   a pair of rear axles providing motive power to said rear wheels;
   a motive power unit coupled to one of said pairs of axles;
   and wherein said motive power transmission includes a clutch usable as said reducing means.

5. A four-wheel-drive vehicle as recited in claim 4, wherein said motive power transmission further includes a first viscous coupling in parallel with said clutch.

* * * * *